US006634102B2

(12) United States Patent
Utecht et al.

(10) Patent No.: US 6,634,102 B2
(45) Date of Patent: Oct. 21, 2003

(54) METHOD OF REMOVING A SENSING ROD FROM A HYDRAULIC WATER PUMP

(75) Inventors: Peter W. Utecht, Menomonee Falls, WI (US); Daniel M. Olson, Menomonee Falls, WI (US)

(73) Assignee: U-Tech Environmental Manufacturing Supply, Inc., Menomonee Falls, WI (US)

( * ) Notice: Subject to any disclaimer, the term of this patent is extended or adjusted under 35 U.S.C. 154(b) by 0 days.

(21) Appl. No.: 10/083,816

(22) Filed: Feb. 27, 2002

(65) Prior Publication Data

US 2003/0159285 A1 Aug. 28, 2003

(51) Int. Cl.[7] .................................................. B23P 15/00

(52) U.S. Cl. .............................. 29/888.021; 29/888.02; 29/402.08; 29/426.5

(58) Field of Search ........................ 29/888.021, 888.02, 29/888, 402.03, 402.08, 426.5, 426.1; 417/53, 222.2

(56) References Cited

U.S. PATENT DOCUMENTS

| | | | | | |
|---|---|---|---|---|---|
| 5,170,656 | A | * | 12/1992 | Draus | 73/1.22 |
| 6,146,106 | A | * | 11/2000 | Suitou et al. | 417/222.2 |
| 6,422,830 | B1 | * | 7/2002 | Yamada et al. | 417/222.2 |
| 2002/0156591 | A1 | * | 10/2002 | Newman | 702/45 |

* cited by examiner

*Primary Examiner*—I Cuda-Rosenbaum
(74) *Attorney, Agent, or Firm*—Donald J. Ersler

(57) ABSTRACT

A method of removing a sensing rod from a hydraulic water pump includes an access plug, a sealing o-ring, and an end block modified to receive the access plug. The access plug preferably includes a front flange, a threaded body, and a rear tapered end. An o-ring groove is formed adjacent the front flange to retain the sealing o-ring. An internal thread is preferably formed in the modified end block to threadably receive the access plug. An opening is formed through the length of the access plug which is sized to receive the sensing rod. The access plug is unthreaded to allow the sensing rod to be removed. A nut removal tool inserted through the internal threads of the modified end block to unscrew a rod nut. Once the rod nut has been unscrewed, the sensing rod may be removed.

18 Claims, 4 Drawing Sheets

METHOD OF REMOVING A SENSING ROD FROM A HYDRAULIC WATER PUMP

BACKGROUND OF THE INVENTION

1. Field of the Invention

The present invention relates generally to hydraulic water pumps and more specifically to a method of removing a sensing rod from a hydraulic water pump without disassembling thereof.

2. Discussion of the Prior Art

Hydraulic water pumps are commonly used to pump water for pipeline cleaning. The hydraulic water pump utilizes a sensing rod to make contact with a roller arm or to trigger a proximity switch. Actuation of the roller arm or activation of the proximity switch causes a solenoid operated hydraulic valve to open the flow of hydraulic oil to one port and close the other port. Unfortunately, the sensing rod is exposed to the outer atmosphere. The sensing rod will become damaged from weather exposure and physical abuse. If the sensing rod becomes damaged, a rod seal will not be able to seal the sensing rod and hydraulic fluid will leak out of the hydraulic water pump. Leakage of hydraulic fluid is unacceptable and the sensing rod must be replaced. However, it takes approximately 10–12 hours to replace the sensing rod, because the hydraulic water pump must be removed from a truck and thereof must also be disassembled. Unfortunately, removing an end plate results in the entire pump becoming disassembled.

Accordingly, there is a clearly felt need in the art for a method of removing a sensing rod from a hydraulic water pump without disassembling thereof.

SUMMARY OF THE INVENTION

The present invention provides a method of removing a sensing rod from a hydraulic water pump for ease of maintenance. The method of removing a sensing rod from a hydraulic water pump includes an access plug, a sealing o-ring, and an end block modified to receive the access plug. The access plug is preferably retained in the modified end block by forming external threads on the access plug, which mate with internal threads formed in the modified end block, but other retention methods may also be used such as retaining the access plug with a snap ring.

The access plug preferably includes a front flange, a threaded body, and a rear tapered end. An o-ring groove is formed adjacent the front flange to retain the sealing o-ring. A rod opening is formed through the length of the access plug which is sized to receive the sensing rod. A flange bore is formed on a front of the modified end block to receive the front flange of the access plug.

The sealing o-ring is inserted into the o-ring groove, before the access plug is threaded into the modified end block. The sealing o-ring prevents oil from leaking from around the outer perimeter of the access plug. When maintenance needs to be performed on the sensing rod, the access plug is unscrewed from the modified end block. A nut removal tool is inserted through the internal threads in the modified end block to unscrew a rod nut. Once the rod nut has been unscrewed, the sensing rod is removed. The hydraulic water pump does not have to be disassembled to replace the sensing rod. Replacement of the sensing rod using the method of removing a sensing rod from a hydraulic water pump takes approximately one hour.

Accordingly, it is an object of the present invention to provide an access plug for a hydraulic water pump which allows maintenance to be performed on a sensing rod without disassembling the entire hydraulic water pump.

These and additional objects, advantages, features and benefits of the present invention will become apparent from the following specification.

DETAILED DESCRIPTION OF THE PREFERRED EMBODIMENTS

Figure 1:
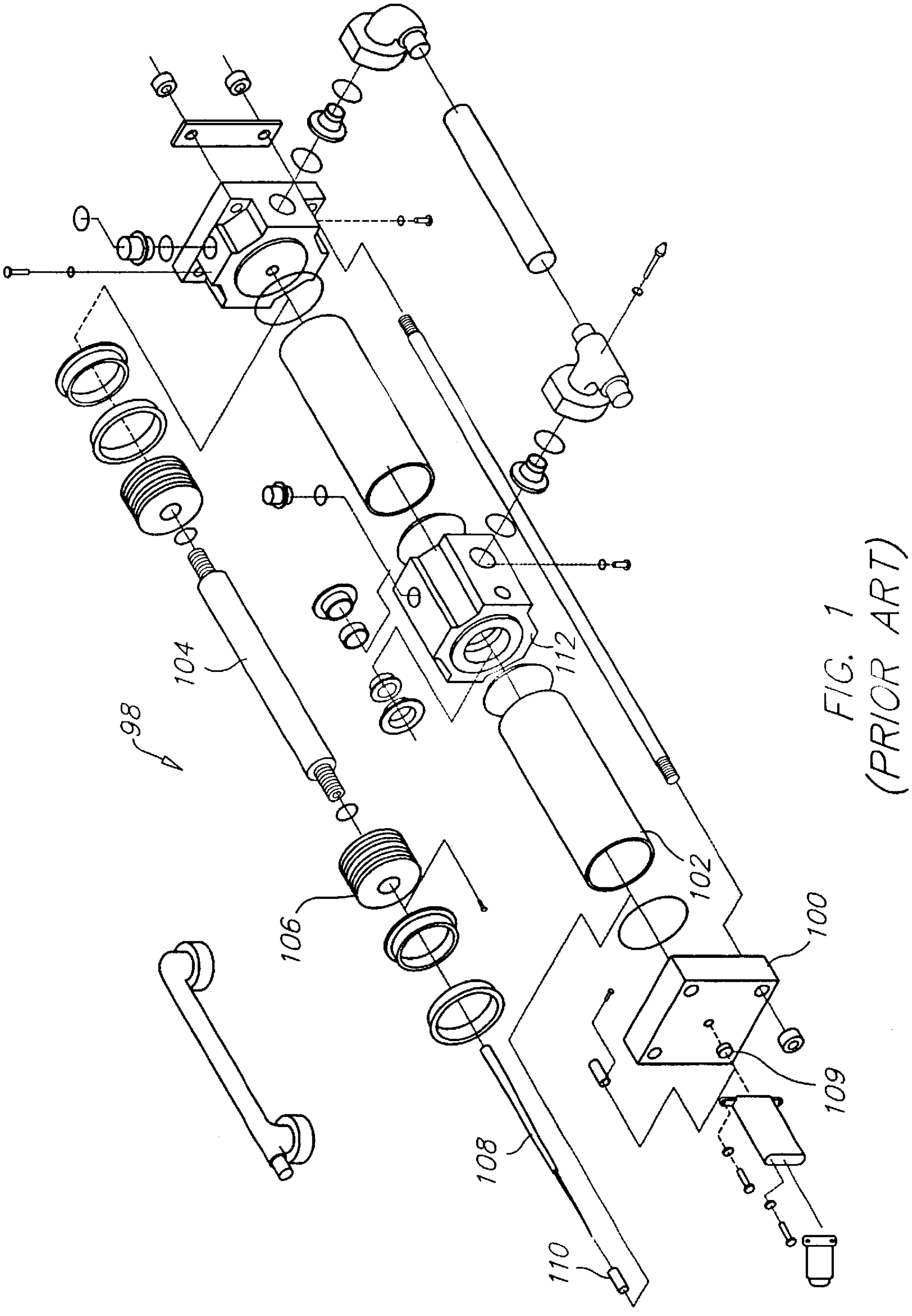
FIG. 1 (PRIOR ART)
FIG. 1 is an exploded perspective view of a prior art hydraulic water pump.
Figure 3:
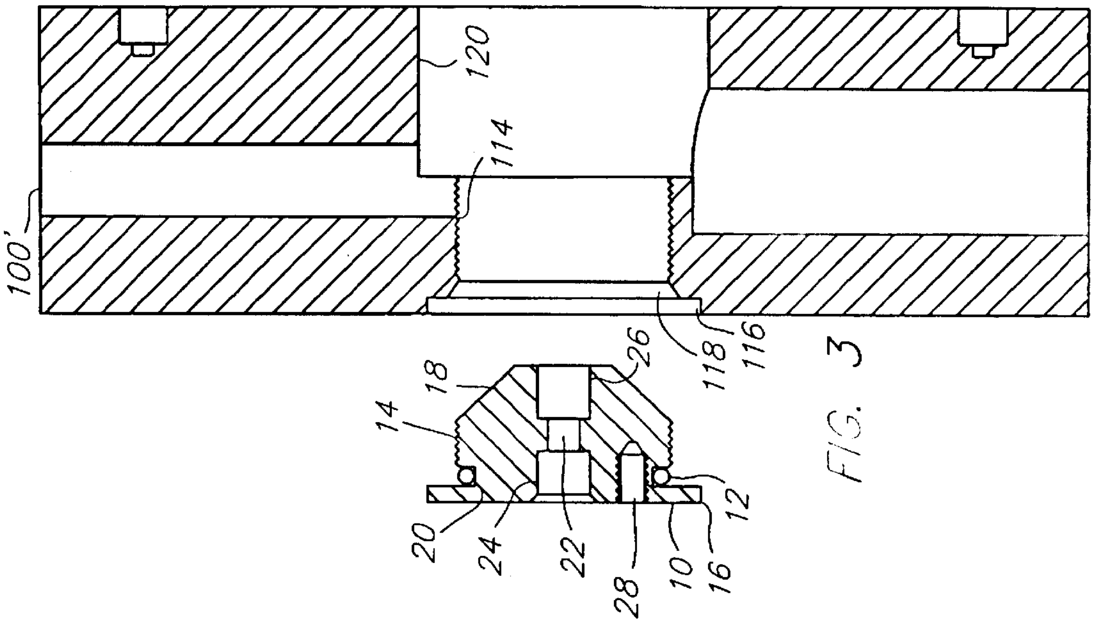
FIG. 3 is a cross sectional view of an access plug and modified end block in accordance with the present invention.
Figure 2:
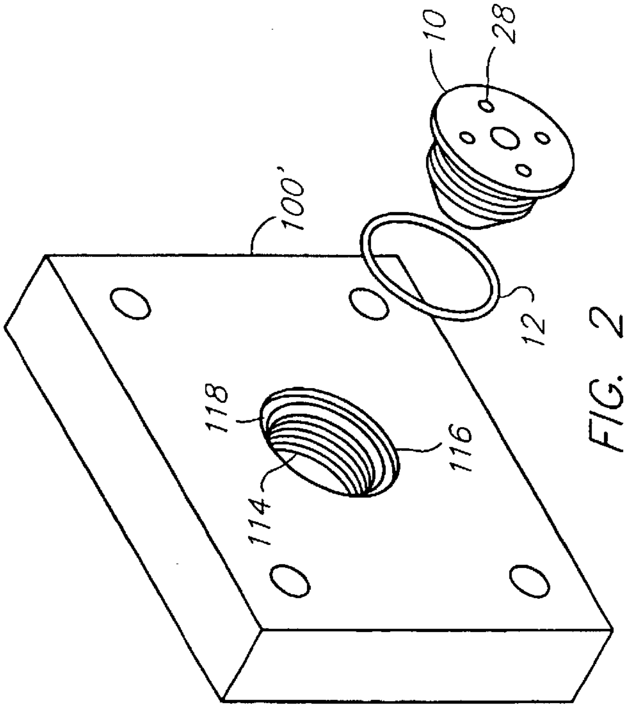
FIG. 2 is a perspective view of an access plug and modified end block in accordance with the present invention.
Figure 4:
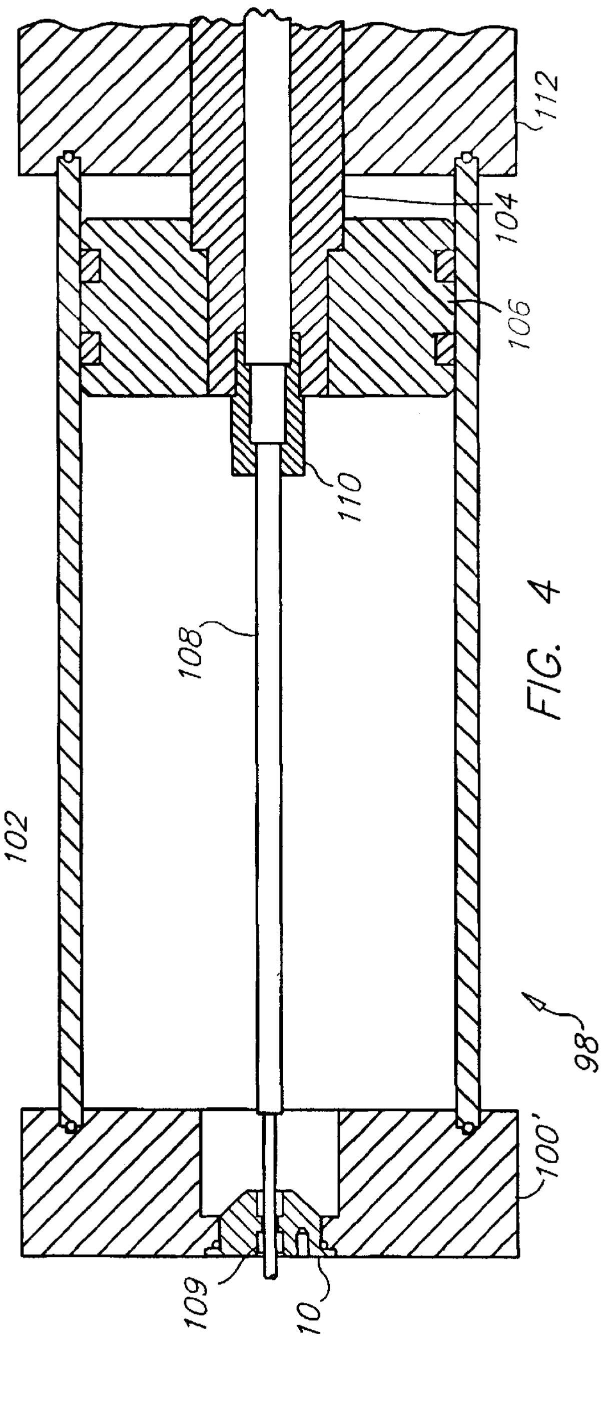
FIG. 4 is a partial cross sectional view of a hydraulic water pump with an access plug threaded into a modified end block in accordance with the present invention.

With reference now to the drawings, and particularly to FIG. 1, there is shown an exploded perspective view of a prior art hydraulic water pump 98. The hydraulic water pump 98 includes an end block 100, an oil cylinder 102, piston rod 104, oil piston 106, sensing rod 108, and rod nut 110 and a center block 112. With reference to FIGS. 2–4, the method of removing a sensing rod from a hydraulic water pump includes an access plug 10, a sealing o-ring 12, and an end block 100 modified to receive the access plug 10. The access plug 10 is preferably retained in a modified end block 100' by forming external threads 14 on the access plug 10, which are threadably engagable with internal threads 114 formed in the modified end block 100', but other retention methods may also be used such as retaining the access plug 10 with a snap ring.

The access plug 10 preferably includes a front flange 16 and a rear tapered end 18. An o-ring groove 20 is formed behind the front flange 16 to retain the sealing o-ring 12. A rod opening 22 is formed through the length of the access plug 10 that is sized to receive the sensing rod 108. Preferably, a seal counterbore 24 is formed in the front flange 16 to receive a rod seal 109. A rod counterbore 26 is preferably formed in the rear tapered end 18 to provide clearance for the sensing rod 108. Preferably, at least two holes 28 are formed in the front flange 16 to receive a spanner wrench. The spanner wrench allows removal of the access plug 10. However, other methods of removing the access plug 10 may also be used.

A flange bore 116 is formed on a front of the modified end block 100' to receive the front flange 16 of the access plug 10. An o-ring bearing surface 118 is formed adjacent the flange bore 116 to provide sealing to the sealing o-ring 12. The o-ring bearing surface 118 is contoured to seal the o-ring 12. The shape of the contour is an industry standard and well known in the art. An oil supply bore 120 is normally formed in a prior art end block 100 for the flow of hydraulic oil.

Figure 5:
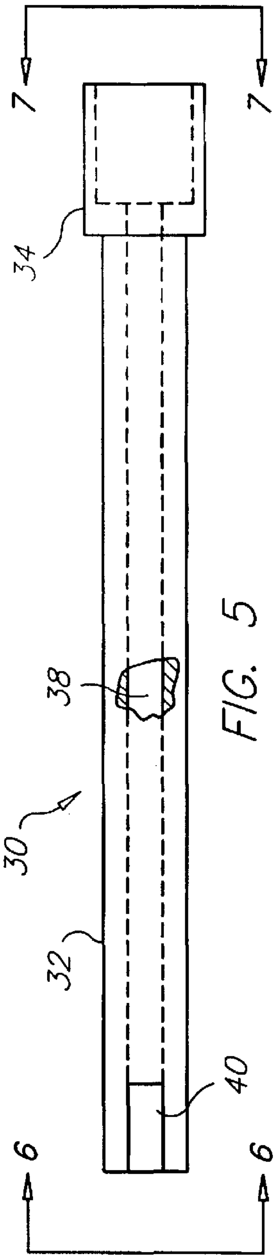
FIG. 5 is a side view of a nut removal tool for removing a rod nut from a hydraulic water pump in accordance with the present invention.
Figure 7:
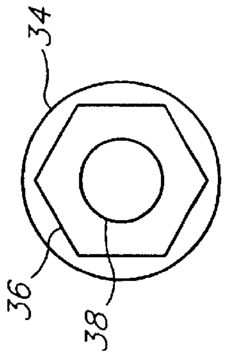
FIG. 7 is an end view of a second end of a nut removal tool in accordance with the present invention.
Figure 6:
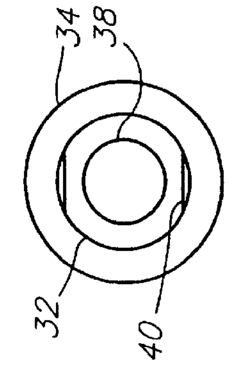
FIG. 6 is an end view of a first end of a nut removal tool in accordance with the present invention.

With reference to FIGS. 5–7, a nut removal tool 30 includes a tubular body 32 terminated by a socket end 34. A socket cavity sin 36 is formed in the socket end 34 to receive the rod nut 110. An inner opening 38 in the tubular body 32 has a cross section which is large enough to provide clearance for the sensing rod 108. Preferably, at least two flats 40 are formed on the outer perimeter of the tubular body 32 at a first end thereof to facilitate gripping by a hand tool.

Figure 8:
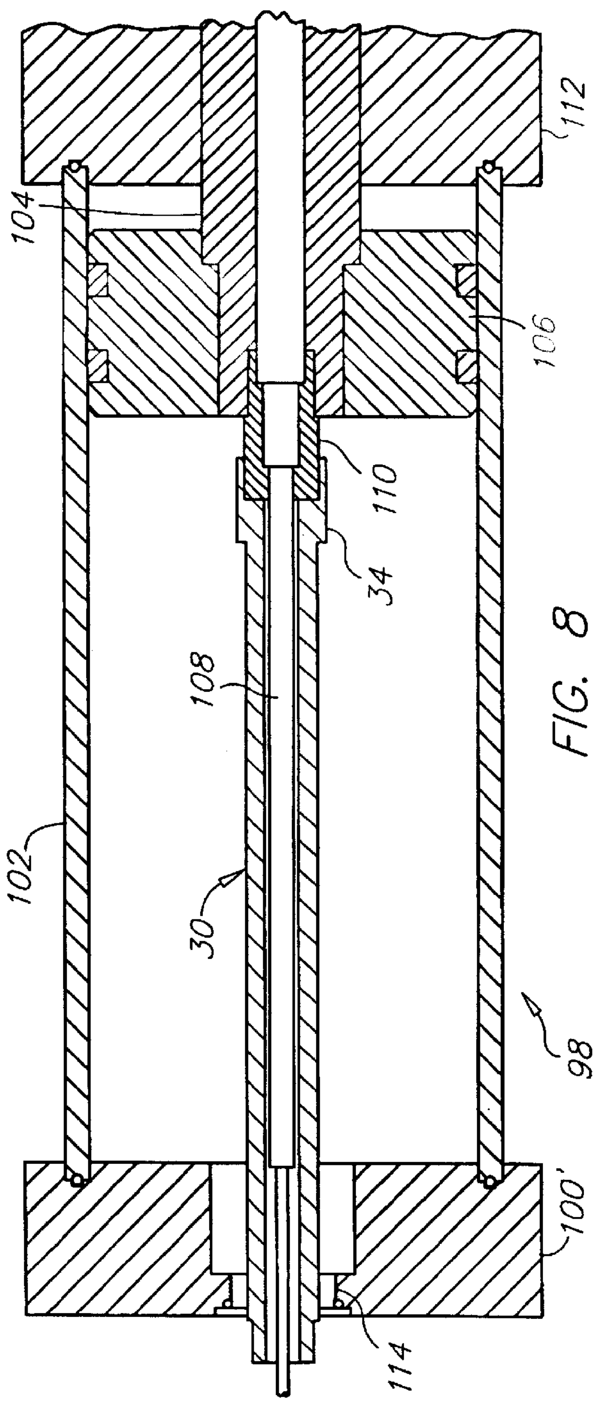
FIG. 8 is a partial cross sectional view of a hydraulic water pump with an access plug removed from a modified end block and a nut removal tool inserted over a rod nut of a hydraulic water pump in accordance with the present invention.

To attach the access plug 10 to the modified end block 100', the sealing o-ring 12 is inserted into the o-ring groove 20 and the access plug 10 is threaded into the modified end block 100'. The sealing o-ring 12 prevents hydraulic oil from leaking from around the outer perimeter of the access plug 10. When maintenance needs to be performed on the sensing rod 108, the access plug 10 is unscrewed from the modified end block 100'. With reference to FIG. 8, the nut removal tool 30 is then inserted through the internal threads 114 in the modified end block 100'. The rod nut 110 is received by the socket cavity 36 of the nut removal tool 30. The nut removal tool 30 is rotated to unscrew the rod nut 110 from an end of the piston rod 104. The sensing rod 108 is withdrawn from the hydraulic water pump 98. The hydraulic water pump 98 does not have to be disassembled to replace the sensing rod 108. A new sensing rod 108 may be inserted and the process reversed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of providing access to a sensing rod of a hydraulic water pump comprising the steps of:

providing an access plug having a rod opening formed through a length thereof;

forming a plug opening through an end block to receive said access plug; and attaching said access plug to said end block to prevent leakage of a fluid.

2. The method of providing access to a sensing rod of a hydraulic water pump of claim 1, further comprising the steps of:

removing said access plug;

inserting a rod removal tool into said plug opening;

unthreading a rod nut with said rod removal tool; and withdrawing the sensing rod from the hydraulic water pump.

3. The method of providing access to a sensing rod of a hydraulic water pump of claim 1, further comprising the step of:

providing a nut removal tool including a tubular body terminated by a socket end, a socket cavity being formed in said socket end to receive the rod nut, an inner opening in said tubular body having a cross section which is large enough to provide clearance for the sensing rod.

4. The method of providing access to a sensing rod of a hydraulic water pump of claim 1, further comprising the steps of:

forming an internal thread in said end block; and forming external threads on said access plug such that said access plug is threadably engagable with said end block.

5. The method of providing access to a sensing rod of a hydraulic water pump of claim 1, further comprising the steps of:

providing a sealing o-ring;

providing a front flange formed on one end of said access plug and a rear tapered end being formed on the opposite end of said access plug; and providing a o-ring groove being formed adjacent said front flange that is sized to receive said sealing o-ring.

6. The method of providing access to a sensing rod of a hydraulic water pump of claim 5, further comprising the steps of:

forming a flange bore in said end block which is sized to receive said front flange; and forming an o-ring bearing surface adjacent said flange bore.

7. The method of providing access to a sensing rod of a hydraulic water pump of claim 5, further comprising the step of:

forming at least two holes in said front flange which are sized to receive a spanner wrench.

8. A method of removing a sensing rod from a hydraulic water pump comprising the steps of:

providing an access plug having a rod opening formed through a length thereof;

forming a plug opening through an end block to attachably receive said access plug;

inserting a rod removal tool into said plug opening;

unthreading a rod nut with said rod removal tool; and withdrawing the sensing rod from the hydraulic water pump.

9. The method of removing a sensing rod from a hydraulic water pump of claim 8, further comprising the step of:

providing a nut removal tool including a tubular body terminated by a socket end, a socket cavity being formed in said socket end to receive the rod nut, an inner opening in said tubular body having a cross section which is large enough to provide clearance for the sensing rod.

10. The method of removing a sensing rod from a hydraulic water pump of claim 8, further comprising the steps of:

forming an internal thread in said end block; and forming external threads on said access plug such that said access plug is threadably engagable with said end block.

11. The method of removing a sensing rod from a hydraulic water pump of claim 8, further comprising the steps of:

providing a sealing o-ring;

providing a front flange formed on one end of said access plug and a rear tapered end being formed on the opposite end of said access plug; and providing a o-ring groove being formed adjacent said front flange which is sized to receive said sealing o-ring.

12. The method of removing a sensing rod from a hydraulic water pump of claim 11, further comprising the steps of:

forming a flange bore in said end block which is sized to receive said front flange; and forming an o-ring bearing surface adjacent said flange bore.

13. The method of removing a sensing rod from a hydraulic water pump of claim 11, further comprising the step of:

forming at least two holes in said front flange which are sized to receive a spanner wrench.

14. A method of removing a sensing rod from a hydraulic water pump comprising the steps of:

providing an access plug having an external thread and a rod opening formed through a length thereof;

forming an internal thread in an end block to threadably receive said access plug;

inserting a rod removal tool into said plug opening;

unthreading a rod nut with said rod removal tool; and withdrawing the sensing rod from the hydraulic water pump.

15. The method of removing a sensing rod from a hydraulic water pump of claim 14, further comprising the step of:

providing a nut removal tool including a tubular body terminated by a socket end, a socket cavity being formed in said socket end to receive the rod nut, an inner opening in said tubular body having a cross section which is large enough to provide clearance for the sensing rod.

16. The method of removing a sensing rod from a hydraulic water pump of claim 14, further comprising the steps of:

providing a sealing o-ring;

providing a front flange formed on one end of said access plug and a rear tapered end being formed on the opposite end of said access plug; and providing a o-ring groove being formed adjacent said front flange which is sized to receive said sealing o-ring.

17. The method of removing a sensing rod from a hydraulic water pump of claim 16, further comprising the steps of:

forming a flange bore in said end block which is sized to receive said front flange; and forming an o-ring bearing surface adjacent said flange bore.

18. The method of removing a sensing rod from a hydraulic water pump of claim 16, further comprising the step of:

forming at least two holes in said front flange which are sized to receive a spanner wrench.

* * * * *